United States Patent [19]

Shaffer

[11] 3,827,528

[45] Aug. 6, 1974

[54] LOW COST AUXILIARY HYDROSTATIC DRIVE FOR TRUCKS

[75] Inventor: Walter M. Shaffer, Peoria, Ill.

[73] Assignee: Towmotor Corporation, Mentor, Ohio

[22] Filed: Oct. 10, 1972

[21] Appl. No.: 296,153

[52] U.S. Cl............................................. 180/44 M
[51] Int. Cl.............................................. B60k 7/00
[58] Field of Search......... 180/6.2, 43, 44, 66, 82.4; 74/471, 479, 480 R; 192/13

[56] References Cited
UNITED STATES PATENTS

| | | | |
|---|---|---|---|
| 2,818,699 | 1/1958 | Clemson | 180/6.2 |
| 3,302,741 | 2/1967 | Brazuk | 180/44 F |
| 3,354,977 | 11/1967 | Swift | 180/44 M |
| 3,391,753 | 7/1968 | Anderson | 180/43 B |
| 3,458,005 | 7/1969 | Malm et al. | 180/43 B |
| 3,493,067 | 2/1970 | Rumsey | 180/43 B |
| 3,522,861 | 8/1970 | Middlesworth | 180/44 R |
| 3,579,988 | 5/1971 | Firth | 180/44 F X |

Primary Examiner—David Schonberg
Assistant Examiner—Terrance L. Siemens
Attorney, Agent, or Firm—Phillips, Moore, Weissenberger, Lempio & Strabala

[57] ABSTRACT

By employing priority valving for fluid pressure normally utilized to operate hydraulic lift and tilt circuits in a lift truck, the fluid output of an engine driven pump normally powering the lift and tilt circuits can be used, when these circuits are idle, to power auxiliary hydraulic motors mounted on the lift truck's dirigible wheels to provide four wheel drive in the lift truck in its low speed ranges. A simplified control lever system, which is mechanically interconnected with the main transmission control linkages of the lift truck, controls both the direction and operation of the auxiliary drive so it is coordinated with that of the main transmission without complex control systems. Also, a simplified hydrostatic wheel drive unit is provided.

8 Claims, 5 Drawing Figures

PATENTED AUG 6 1974 3,827,528

LOW COST AUXILIARY HYDROSTATIC DRIVE FOR TRUCKS

BACKGROUND OF THE INVENTION

It has been common practice to utilize hydraulic or electric motors on steerable or dirigible wheels of various types of vehicles in order to avoid the complicated gear trains, axles, clutches and differentials that would otherwise be necessary to power such dirigible wheels in order to achieve a four wheel drive capability. Vehicles having such four wheel drive capability are shown in U.S. Pat. No. 3,469,648 issued to Cannon; U.S. Pat. No. 3,186,506 issued to Leach et al; U.S. Pat. No. 3,458,005 issued to Malm et al., and U.S. Pat. No. 3,272,276 issued to Budzich, which are representative of the prior art in this area. Due to the small relative size of suitable hydraulic motors and the ability to connect these motors to a source of fluid pressure on the vehicle through flexible reinforced hoses, the hydraulic motor units have often been mounted directly on the dirigible wheel.

Since lift trucks need the maximum maneuverability and usually require only limited service from a four wheel drive capability, such auxiliary drives on its dirigible wheels are not econimically feasible because of the costs of complicated control systems necessary for their operation. Also the expense of an engine driven hydraulic pump which is necessary for providing the source of fluid power for the hydraulic motors on the dirigible wheels adds to the costs. Further, the prior art arrangements for mounting these hydraulic motors on the dirigible wheels tends to be bulky, expensive and in some cases requires special mounting devices and imposes restrictions on the "cramp" angle of their associated dirigible wheels which is undesirable in lift trucks.

Thus, it is an object of the instant invention to provide auxiliary hydraulic drive providing four wheel drive capability on lift trucks, through dual utilization of an existing pump normally used to power the hydraulic lift and tilt circuits when they are not in service, thereby making a four wheel drive economically feasible in trucks.

It is also an object to provide an auxiliary which can be added to existing lift trucks without expensive modification to the lift truck.

Another object of this invention is the provision of a simplified mounting for a hydraulic motor on a dirigible wheel which imposes little limitation on the cramp angle during steering.

Other objects and advantages of the instant invention will be apparent from the written description and the accompanying drawings describing and disclosing this invention.

SUMMARY OF THE INVENTION

The above objects can be accomplished in a lift truck having hydraulic lift and tilt components powered by an engine drive hydraulic pump and dirigible wheels, by replacing the non-powered dirigible wheels with hydraulically powered dirigible wheel units having a hydraulic motor mounted thereon for driving the wheel of the unit, incorporating in the lift truck hydraulic circuitry connecting the engine driven pump powering the lift and tilt components with the hydraulic motors of the wheel units, providing valving devices in the hydraulic circuitry which are connected to the valves operating the lift and tilt components to be operable to interrupt the fluid communication between the pump and hydraulic motors when the lift or tilt components are actuated and incorporating an auxiliary drive control valve in the hydraulic circuitry operable to control the direction and flow of pressurized hydraulic fluid from the pump to the hydraulic motors whereby a four wheel drive capability is provided economically in lift trucks by making dual use of an existing engine pump in such lift trucks.

BRIEF DESCRIPTION OF THE DRAWINGS

The invention will be better understood by reference to the drawings wherein.

DESCRIPTION OF AN EMBODIMENT

Figure 1:
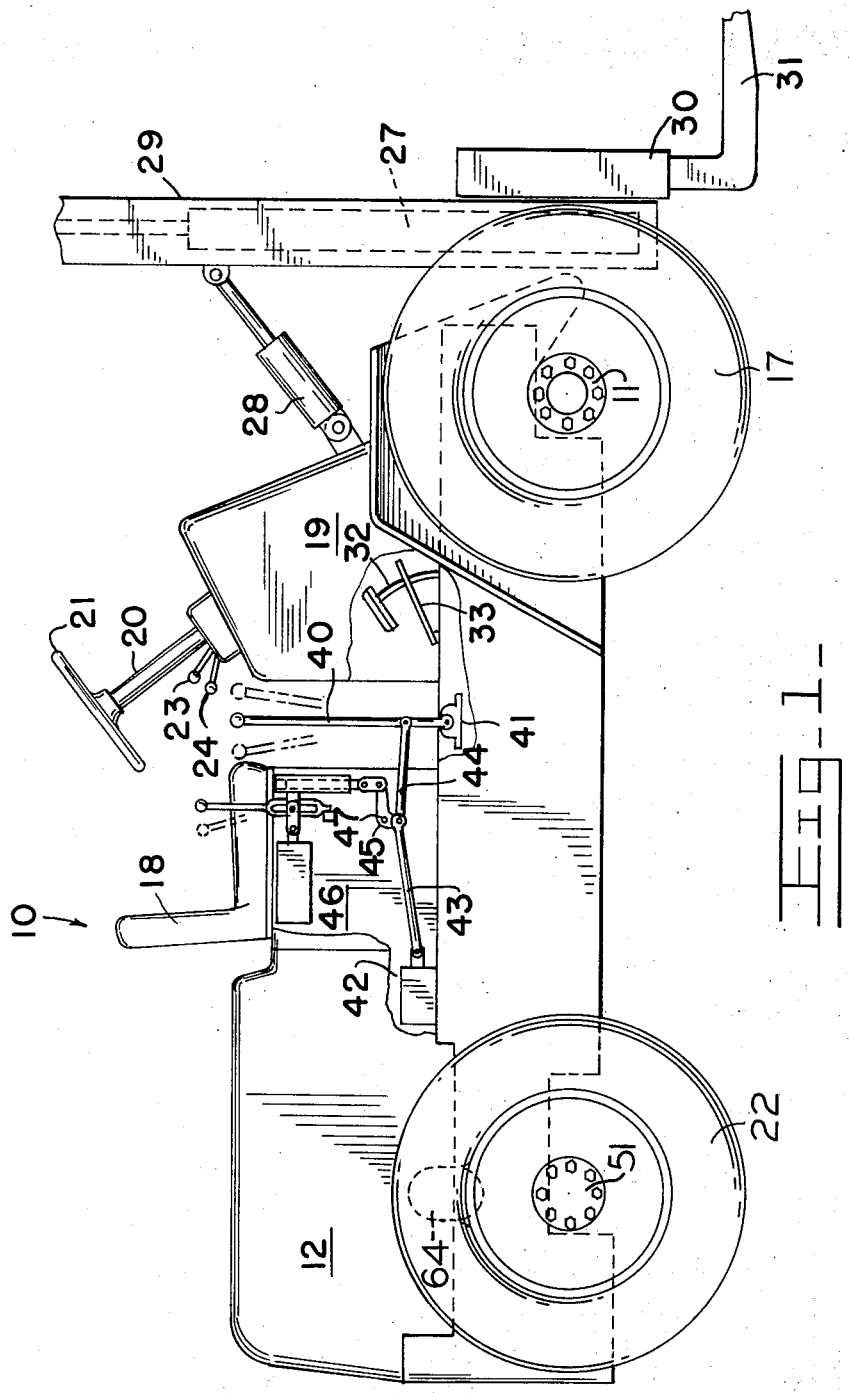
FIG. 1 is an elevation of a four wheel lift truck with the auxiliary drive features incorporated therein.
Figure 2:
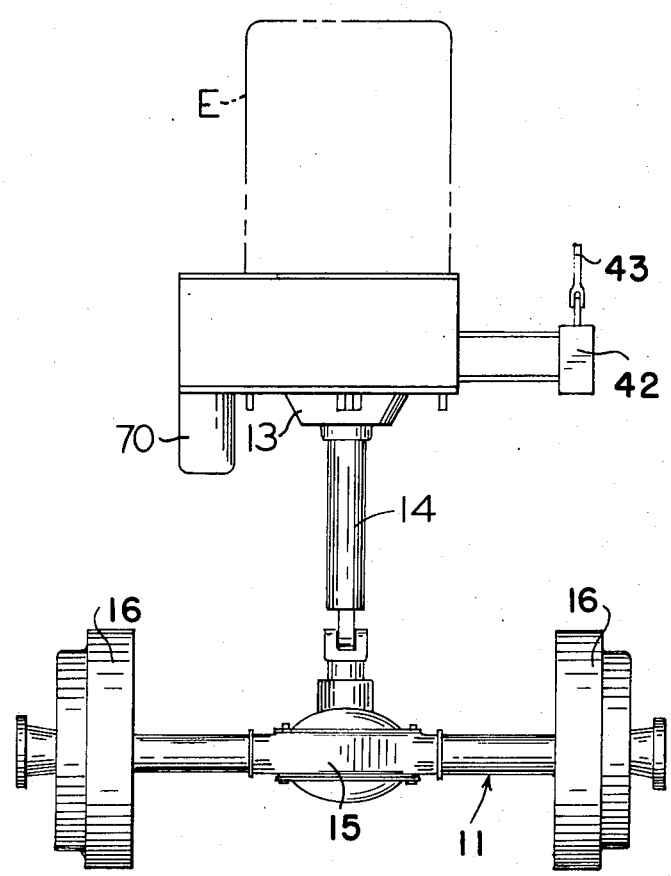
FIG. 2 is a plan of the conventional drive train in the lift truck illustrated in FIG. 1 with the engine indicated with broken lines.

In FIG. 1 a lift truck 10 is illustrated which uses a conventional front wheel drive system best shown in FIG. 2. An engine E (indicated by broken lines in FIG. 2) is mounted over the rear axle 51, under hood 12, with the engine output shaft connected in a bell housing of a hydrostatic transmission 13 to drive the input of the transmission. The output of the hydrostatic transmission is connected to the front axle by a torque tube 14 through a differential 15. At the outboard ends of the axle, final drive assemblies 16 are attached to provide the reduction gearing through which front wheels 17 are driven. A suitable hydrostatic transmission for this type of lift truck is illustrated in U.S. Pat. No. 3,486,335 issued to Kern et al. Such a transmission offers a selection of nearly infinite speed ratios between its input and output within the speed range of the transmission and therefore is a preferred drive train in lift trucks because of this feature.

Centrally located on the lift truck is an operator's seat 18 with an adjacent steering wheel 21 and steering column 20 mounted in a pedestal 19 located forward of the seat through which the rear dirigible wheels 22 of the lift truck are maneuvered to steer the lift truck.

On the pedestal 19 a lift control lever 23 connected to a lift control valve 25 is mounted, along with a tilt control lever 24 which is connected to a tilt control valve 26. These valves when actuated respectively operate the mast cylinders 27 and the tilt cylinders 28 for controlling a mast 29 and a carriage 30 with forks 31 that are reciprocated vertically on the mast structure in a conventional manner when the lift and tilt levers are operated.

Adjacent to the base of the pedestal are the brake pedal 32 and the engine accelerator pedal 33 providing the engine controls for the movement of the vehicle.

On the frame of the lift truck between the pedestal and seat is a transmission control lever 40 that is pivoted on a bracket 41 attached to the frame. Fore and aft movements of this lever will position the spool of transmission valve 42 through rod linkages 43 and 44 having their contiguous ends commonly connected to one end of a bellcrank 45 mounted on pivot pin 47 on seat support structure 46. The transmission lever, shown in a neutral position in FIG. 1, can be advanced forwardly to select a forward vehicle speed and rearwardly to select a reverse speed by positioning the spool of the transmission valve 42 for the appropriate speed. Bellcrank 45 forms part of the special mechanical control system for the rear wheel auxiliary drive system which will be discussed subsequently.

By providing drive motors (illustrated in FIG. 3) on dirigible wheels 22 a four wheel drive capability is obtained. In the instant invention specially designed wheel drive units 49 are provided which can be swingably mounted at the ends of the rear axle 51 by a king pin 52 so a spindle 53 will support an associated rear wheel rotor 22a on wheel bearings 54 and 55. Above the spaced ears of each drive unit, pivotally pinned to the ends of the rear axle with the king pin, a stub shaft 56 is journalled in the housing 50 on bearings 57 with a pinion gear 58 keyed to its outboard end and a spline formed on its opposite end. With the rotor 22a of the associated wheel journalled on the spindle and connected to a drum 60, which encircles a portion of the housing of the wheel unit, an internal ring gear 59 in the drum meshes with the pinion and drives the rotor through power supplied to the stub shaft. A seal 61 between the drum and the housing prevents the ingress of dirt into the reduction gear drive formed by the pinion and the ring gear.

Figure 3:
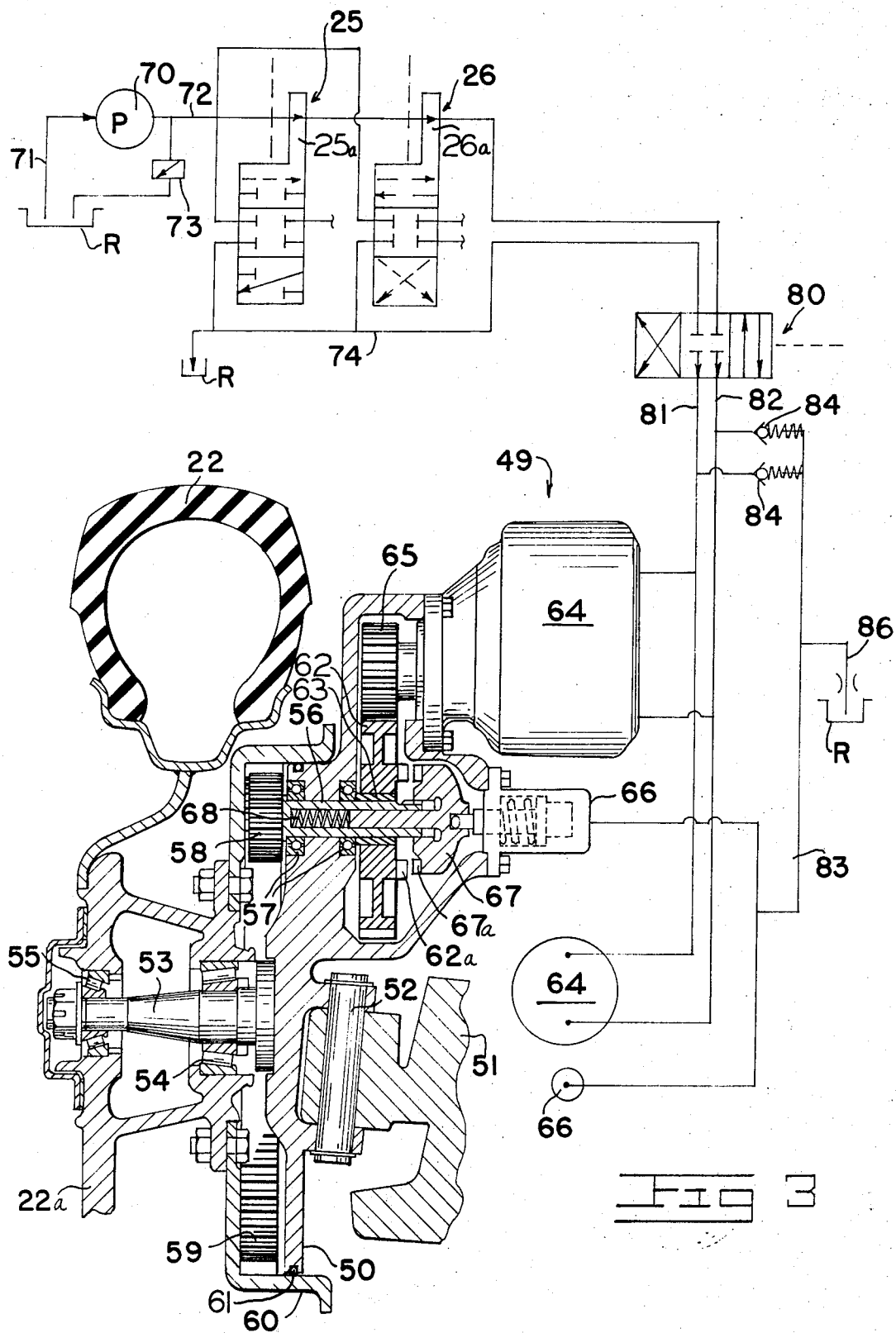
FIG. 3 is a section of a hydrostatic wheel drive unit, with parts broken away, used to replace the normal dirigible wheels of the lift truck illustrated in FIG. 1 to provide a four wheel drive capability.

A reduction gear 62 is mounted on stub shaft 56 to free-wheel on its bearing 63 within the housing 50 and meshes with a drive pinion 65 connected to the output shaft of a hydraulic motor 64 mounted on the upper portion of the housing so its drive pinion can be inserted through an aperture therein, as can be seen in FIG. 3. The hydrostatic motor can be selected from commercially available, positive displacement hydraulic motor units with internal reduction gearing. Since these units can be driven in both directions by reversing the flow of hydraulic fluid supplied to them from a pressurized source, directional control can be obtained by valving the hydraulic fluid used to power them.

As can be seen in FIG. 3 the gear train is arranged so the hydraulic motor 64 is mounted well above king pin attachment and does not require a bulky housing. This arrangement limits interference with the axle 51 and adjacent parts of the vehicle during steering operations. As a result steering is not impaired by the unit when it is installed on the lift truck.

Since reduction gear 62 is mounted to free-wheel on the stub shaft 56 and is driven by the hydraulic motor 64, it must be physically connected to the stub shaft to drive wheel 22 through the latter's rotor and drum. To accomplish the necessary connection a simple toothed clutch disc 67 is telescopically mounted on the splined end of the stub shaft with a mating internal spline and so its mandrel end is received in a blind counterbore in the stub shaft which contains spring 68. Cooperating teeth 62a are formed on the adjacent face of the reduction gear 62 and when teeth 67a of the clutch disc are moved into engagement therewith, compressing spring 68, a drive train between the hydraulic motor and the wheel is established. This simple gear arrangement and clutch connection takes a minimum amount of space and can be built economically.

A spring loaded cylinder 66 has a plunger which engages the outboard end of the clutch disc 67, mounted on the housing 50 so its plunger can move the teeth of the clutch disc and reduction gear into engagement when it is pressurized by hydraulic fluid. When the cylinder is depressurized the spring 68 disengages the clutch. Since both wheel units are similar only one has been described in detail in the above description.

In the schematic of the hydraulic circuitry illustrated in FIG. 3, the engine driven pump 70 for the lift and tilt circuits is connected to a hydraulic reservoir R through intake 71 and supplies hydraulic fluid under pressure to the lift valve 25 and the tilt valve 26 via supply line 72. A relief valve 73 controls the maximum pressure in the circuit, and drain line 74 also connected to these valves forms a return to reservoir for exhaust hydraulic fluid.

Both valves 25 and 26 have a secondary control spool 25a and 26a respectively (schematically illustrated) through which a branch of supply line 72 is serially connected to directional valve 80 of the auxiliary drive. When either the lift or tilt valves is operated the supply of pressurized fluid to directional and control valve 80 is interrupted and therefore the lift and tilt circuits have priority on the output of pump 70. The directional and control valve is also connected to reservoir through line 74 to return exhaust hydraulic fluid.

Directional and control valve 80 is commonly connected to the hydraulic motors 64 on wheel units 49 with parallel circuitry formed by lines 81 and 82. Thus when the spool of the directional valve is shifted one of these lines will be pressurized by pump 70 and the other will return exhaust fluid from the motor 64 to the reservoir. A separate clutch line 83 is commonly connected to the two clutch hydraulic cylinders 66 and also to lines 81 and 82 through one-way check valves 84. As a result of this connection, if either line 81 or 82 is pressurized the two clutches will be automatically engaged. A small orifice 86 connects clutch line 83 to reservoir so that the clutches will release if neither of lines 81 or 82 is pressurized.

Figure 5:
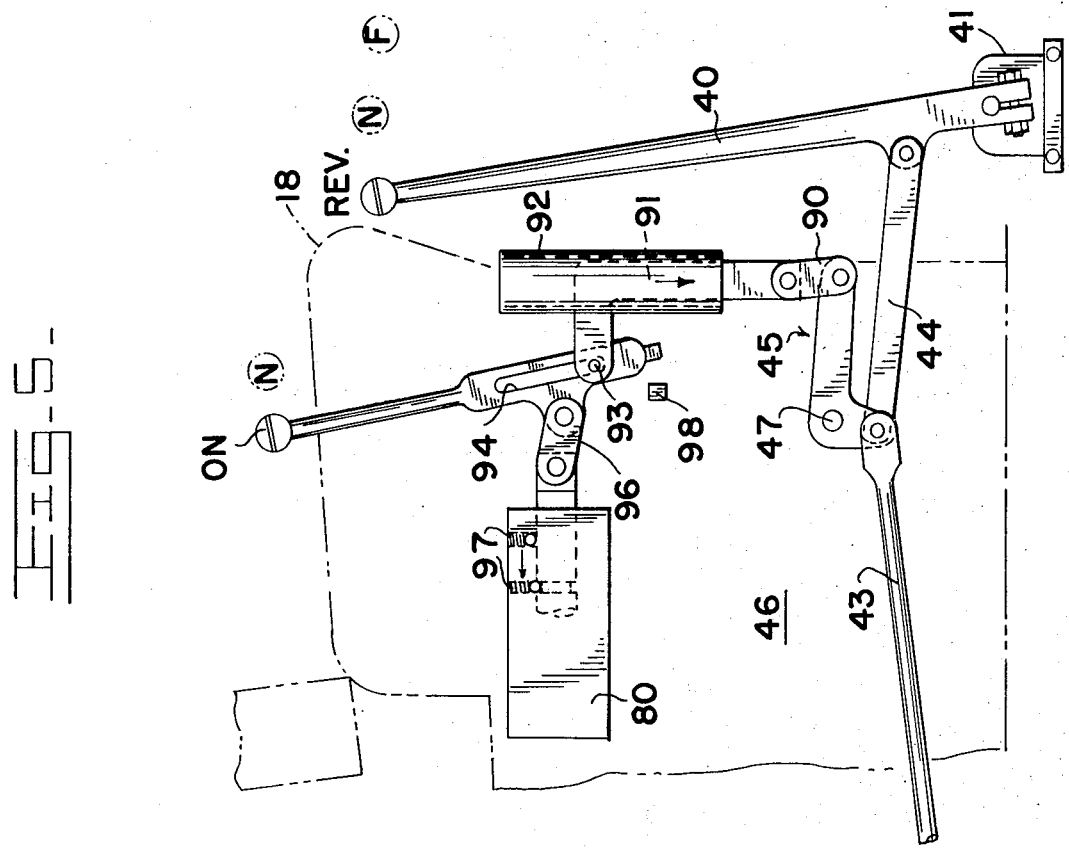
FIGS. 4 and 5 illustrate the simple mechanical control linkage in forward and reverse conditions for controlling direction of the auxiliary drive system in conjunction with the transmission drive direction of the conventional drive train of the lift truck illustrated in FIG. 2.
Figure 4:
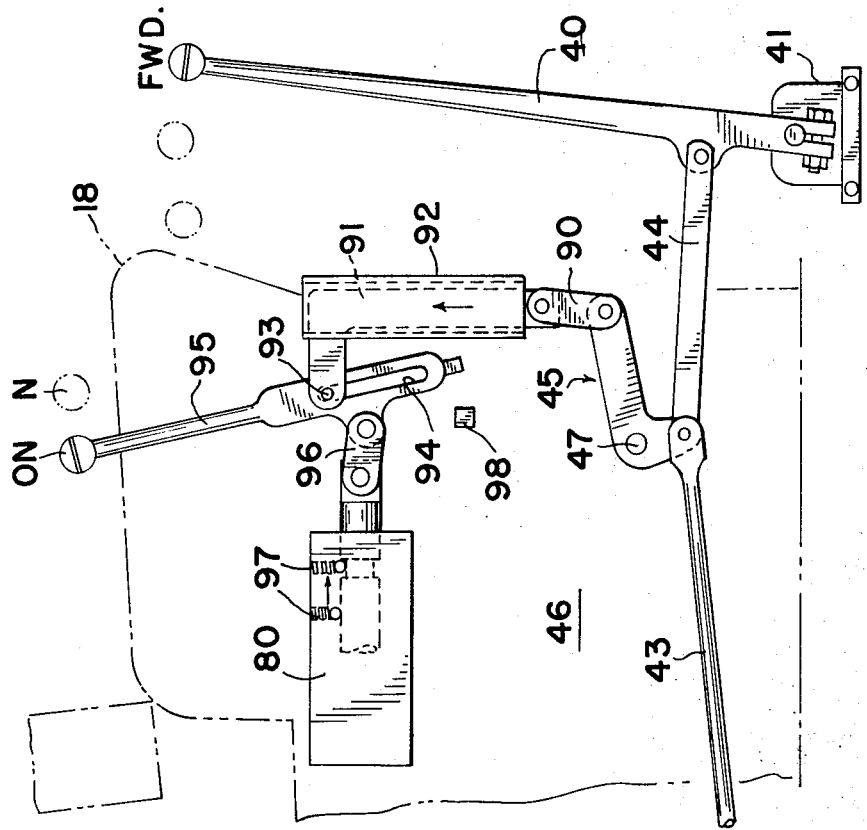

The above hydraulic circuitry arrangement provides the priority control for the output of pump 70 and the direction control of the auxiliary drive, i.e., coordination with the direction of the main drive train is automatically obtained by a special mechanical linkage. This mechanical linkage is best shown in FIGS. 4 and 5 and bellcrank 45 forms a part thereof, as previously indicated. As can be seen in the drawings, transmission control lever 40 is linked to one end of the bellcrank and will change the position of the other end which is connected by a clevis 90 to a fulcrum arm 91 which is reciprocally mounted in a vertical slide tube 92 so its position will be controlled by the position of the bellcrank. With the transmission lever in neutral the fulcrum pin 93 of the arm is in axial alignment with the cylindrical axis of the valve spool of valve 80 and located in a slot 94 of the auxiliary drive control lever 95. The drive lever has a clevis 96 connecting it to the spool in valve 80 and all the joints and the fulcrum pin are all in alignment with the cylindrical axis of the spool in the neutral transmission position, illustrated in FIG. 1. As a result, rearward movement of the auxiliary speed control lever will not operate the directional valve 80 of the auxiliary drive.

If the transmission lever is laced in the forward mode, the fulcrum pin is moved upwardly and out of alignment with the spool of valve 80 (See FIG. 4). In such a situation rearward movement of the auxiliary speed control lever will move the spool of this direction control valve for forward auxiliary drive. However, if the transmission control lever 40 has been in the reverse position (see FIG. 5) the fulcrum pin would have been lowered below the aligned position and the directional valve would have been shifted in the opposite direction giving reverse auxiliary drive. It should be noted that if the transmission control lever is shifted from forward to reverse during an auxiliary drive condition the auxiliary drive circuits would be neutralized as the fulcrum pin would pass through the "aligned position" returning lever 95 to neutral (N). Spring loaded ball arrangements 97 cooperate with a groove in the spool of valve 80 to hold the auxiliary drive in the "on" position when set with lever 95. A stop 98 prevents this lever from being pushed forward of the neutral position and the same rearward movement of this control lever gives auxiliary drive for the forward and reverse modes.

The aforedescribed linkage automatically sets the auxiliary drive system for forward or reverse drive, depending on the direction of operation of the main drive train and automatically neutralizes the auxiliary drive when the main drive train is neutralized.

What is claimed is:

1. In a lift truck having hydraulic lift and tilt components powered by an engine driven hydraulic pump, an auxiliary hydrostatic drive system connected to use the output of this engine drive pump subject to priority of lift and tilt components giving a four wheel drive capability comprising:

dirigible wheel units on said lift truck for steering it;

hydraulic wheel motors mounted on each dirigible wheel unit nd operably onnected to transmit power to the associated wheel of each wheel unit;

hydraulic circuitry connecting said hydraulic wheel motors with the same engine driven pump used to power said lift and tilt components;

separate valve means connected to said pump and said lift and tilt components to independently operate said components, each of said valve means having fluid cut-off means connected in said hydraulic circuitry operable to interrupt fluid communication between said pump and said hydraulic wheel motors in at least one direction of flow when its associated component is operated; and control valve means connected in said hydraulic circuitry operable to control both the direction and flow of pressurized hydraulic fluid from said pump to said hydraulic wheel motors through said hydraulic circuitry, said fluid cut-off means being located upstream of said control valve means.

2. The auxiliary drive system defined in claim 1 wherein the hydraulic circuitry connects the hydraulic motors in parallel.

3. The auxiliary drive system defined in claim 1 wherein each dirigible wheel unit includes clutch means operable to couple and decouple its hydraulic motor with its wheel.

4. The auxiliary drive system defined in claim 3 wherein the clutch means includes a hydraulic actuator coupled to the hydraulic circuitry operable to couple the hydraulic motor and wheel when said circuitry is pressurized and spring means to decouple them when said hydraulic circuitry is not pressurized.

5. The auxiliary drive system defined in claim 4 wherein each hydraulic motor is a positive displacement reversible hydraulic motor.

6. The auxiliary drive system defined in claim 1 wherein the control valve means includes linkage means connected to transmission components of the lift truck and said control valve means operable to condition said control valve means so operation thereof will cause direction of the auxiliary drive system to match that of said transmission components.

7. The auxiliary drive system defined in claim 6 wherein the transmission components include a hydrostatic transmission in the drive train of the lift truck.

8. The auxiliary drive system defined in claim 1 wherein each dirigible wheel unit includes hinging means for connecting it to an axle, a spindle with a rotor journalled thereon, said rotor having an attached drum with an internal ring gear, and a drive pinion engaging the ring gear to drive a wheel mounted on said rotor.

* * * * *